United States Patent [19]

Achtstaetter

[11] Patent Number: 4,504,862
[45] Date of Patent: Mar. 12, 1985

[54] DIGITAL CIRCUIT FOR GENERATING A BINARY SIGNAL ON THE OCCURRENCE OF A GIVEN FREQUENCY RATIO OF TWO SIGNALS

[75] Inventor: Gerhard Achtstaetter, Gundelfingen, Fed. Rep. of Germany

[73] Assignee: ITT Industries, Inc., New York, N.Y.

[21] Appl. No.: 439,011

[22] Filed: Nov. 3, 1982

[30] Foreign Application Priority Data

Nov. 19, 1981 [EP] European Pat. Off. ........ 81109759.1

[51] Int. Cl.³ .............................................. H04N 9/44
[52] U.S. Cl. ...................................... 358/158; 358/17; 307/527
[58] Field of Search ................. 358/158, 148, 150, 17; 307/525, 526, 527, 528

[56] References Cited

U.S. PATENT DOCUMENTS 4,454,531  6/1984  Elmis ..................... 358/17

Primary Examiner—Tommy P. Chin
Attorney, Agent, or Firm—Donald J. Lenkszus

[57] ABSTRACT

To generate a binary signal on the occurrence of a given frequency ratio of two signals, the higher-frequency, first signal is applied to the count input of a first up-counter whose maximum count is greater than the frequency ratio. The attainment of a count of the first up-counter in an upper range of successive counts which includes the frequency-ratio count and the maximum count is monitored by a decoder having an output for all range counts, an output for a count lying a few counts before the frequency-ratio count, and an output for the frequency-ratio count. The first of these outputs is coupled to the control input of an electronic make contact; the second output is coupled to the trigger input of a monostable multivibrator, and the third output is connected to one of the two signal inputs of an electronic switch having its other signal input connected to the output of the make contact. The output of the multivibrator is connected to the up-down control input of an up-down counter having a lower count output and an upper count output coupled, respectively, to the R input and the S input of an RS flip-flop whose Q output is connected to the control input of the switch. The start-reset input of a second up-counter, whose maximum count is locked up, is connected to the Q output of the flip-flop, while the output of the switch is coupled to the reset input of the first up-counter. The second signal is applied to the signal input of the make contact and to the count inputs of the second up-counter and the up-down counter. The binary signal appears at the maximum-count output of the second up-counter.

4 Claims, 3 Drawing Figures

DIGITAL CIRCUIT FOR GENERATING A BINARY SIGNAL ON THE OCCURRENCE OF A GIVEN FREQUENCY RATIO OF TWO SIGNALS

BACKGROUND OF THE INVENTION

1. Field of the Invention

The present invention relates to a digital circuit for generating a binary signal on the occurrence of a given frequency ratio of two signals. More particularly, the invention relates to a circuit wherein the higher-frequency, first signal is applied to the count input of a first up-counter whose maximum count is greater than the frequency ratio, wherein the second signal is applied to the count input of an up-down counter, and which includes at least one monostable multivibrator.

2. Description of the Prior Art

A digital circuit of this kind is disclosed in U.S. patent application Ser. No. 350,556 filed Feb. 22, 1982, now U.S. Pat. No. 4,454,531. It may be needed in color-television receivers, for example, to determine the ratio between the chrominance-subcarrier frequency and the horizontal frequency, which ratio is given at the transmitting end both in the PAL system and in the NTSC system.

As is well known, in television receivers, not only the chrominance-subcarrier frequency and the horizontal frequency but also the field frequency and the horizontal frequency are characterized by a fixed ratio. The "recognition" signal of the latter frequency ratio can be used to control a vertical portion generating the vertical synchronizing pulses by frequency division of a signal of twice the horizontal frequency in order to achieve improved vertical synchronization. The principles of such vertical portions are disclosed, for example, in Offenlegungsschrift DE No. 24 49 535 A1. In the prior art arrangements, an inaccuracy may occur which is visible on the screen by image motion and is due to insufficient detection of but slight frequency errors. The inventor has found that the image motion can be completely eliminated by generating a signal indicating the presence of the given frequency ratio, and using this signal for control purposes.

While the problem to be solved by the invention was just explained with reference to television receivers, the use of the invention is not limited to this specific case, which only represents a preferred application of the invention.

SUMMARY OF THE INVENTION

The object of the invention as claimed is to provide a universally usable digital circuit for generating a binary signal on the occurrence of a given frequency ratio of two signals, the two states of the binary signal indicating, respectively, the presence and the absence of the frequency ratio.

The advantages offered by the invention are mainly that the circuit is implemented exclusively with digital circuit means and, thus, is ideally suited for monolithic integration, particularly for integration in insulated-gate field-effect transistor technology, i.e., in so-called MOS technology.

DESCRIPTION OF THE INVENTION

Figure 1:
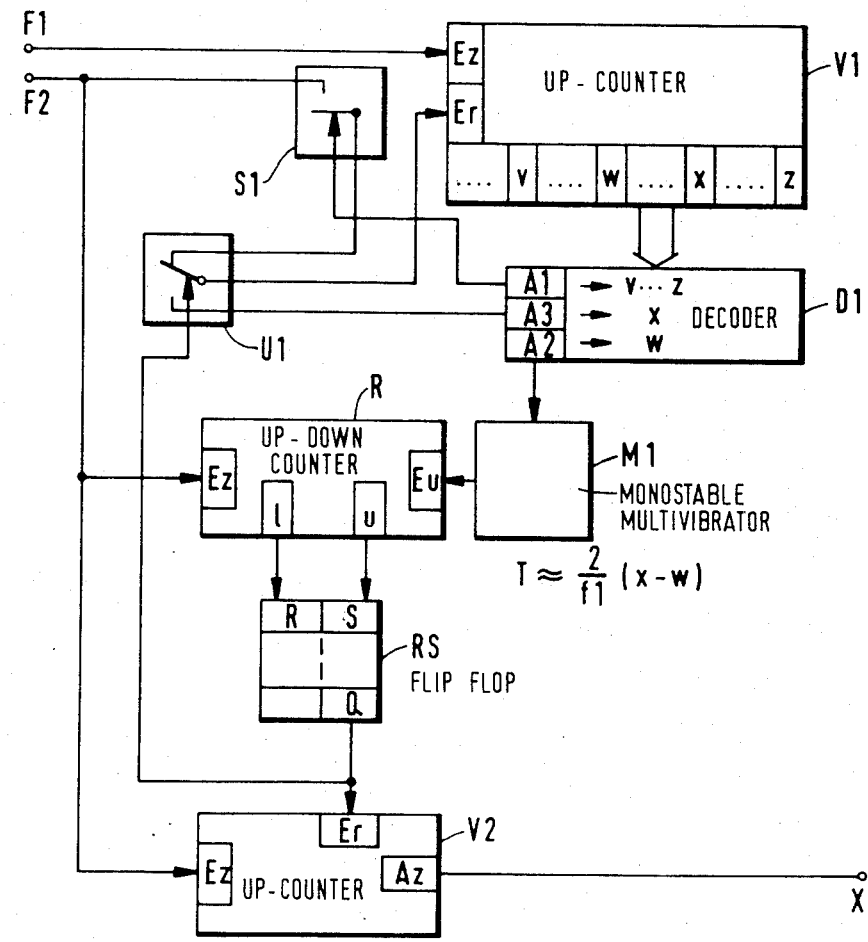
FIG. 1 is a block diagram of an embodiment of the invention.

In the embodiment of FIG. 1, the higher-frequency, first signal F1 of the two signals F1, F2, whose frequency ratio is to be determined or measured, is applied to the count input Ez of the first up-counter V1. The maximum count z is greater than the frequency ratio $x' = f1/f2$, where f1 is the frequency of the first signal F1, and f2 is the frequency of the second signal F2.

A first decoder D1 monitors an upper range of successive counts v ... w ... x ... z of the up-counter V1, this monitored range also covering the frequency-ratio count x and the maximum count z. The monitored range further includes a count w lying a few counts, e.g., 5 to 10 counts, before the frequency-ratio count x, and the count v, lying at the beginning of the monitored range. The subranges below and above the frequency-ratio count x are preferably equally large, so that the count x is located at the center of the monitored range. The following relation thus holds for this preferred case:

$$x - v = z - x$$

The entire range is monitored by means of the first decoder D1, for which any conventional count monitoring circuit can be used. The first decoder D1 has a first output A1 for all range counts v ... z, a second output A2 for the count w, and a third output A3 for the frequency-ratio count x. When the first up-counter V1 reaches one of the aforementioned counts, and positive logic is used, the respective output of the first decoder D1 will assume the more positive level of two binary-signal levels H and L, i.e., the H level. Accordingly, the first output A1 is at H level while the up-counter V1 is passing through the monitored range, i.e., through the counts v ... z.

The first output A1 is connected to the control input of a first electronic make contact switch S1, i.e., when counts within the monitored range v ... z are reached, the contact is closed, and the second signal F2 applied to its signal input is transferred to its output.

The third output A3 is coupled to the first signal input of a first electronic switch U1, whose second signal input is connected to the output of the first electronic make contact S1, and whose output is coupled to a reset input Er of the first up-counter V1.

The second output A2 is coupled to the trigger input of the first monostable multivibrator M1, which forms a "time window" for the measurement and has its output connected to an up-down control input Eu of the up-down counter R. This counter R is fed with the pulses of the second signal F2, which it thus counts in the forward or backward direction according to the output signal of the first monostable multivibrator M1. At least one lower count output 1 and at least one upper count output u of the counter R are monitored and are connected, respectively, to the R and S inputs of an RS flip-flop RS. Thus, both two such single counts and two count ranges each covering such a single count can be monitored.

The Q output of the RS flip-flop, which assumes a H level when a H level is applied to the S input, is connected to the control input of the first electronic switch U1 and to a start-reset input Er of a second up-counter V2, whose count input Ez is fed with the second signal F2, and whose maximum-count output Az provides the desired binary signal X indicating the presence or absence of the frequency ratio x'. The start-reset input Er is a so-called active low input as is commonly used in such counters, i.e., the counter is reset to the initial state and held in this state as long as the more negative level, i.e., the L level, of two binary-signal levels L, H is applied.

For the following explanation of the operation of the circuit it will be assumed that the initial state of the digital circuit is characterized by the fact that the RS flip-flop RS is in its R state, which can be achieved, for example, by applying a pulse to the R input when the supply voltage is turned on. The first electronic switch U1 is then in the state shown, i.e., the output of the first electronic make contact S1 is connected to the reset input Er of the first up-counter V1.

Between two pulses of the second signal F2, the first up-counter V1 will thus run through more or less than one full count cycle starting from any count; in any case, it will sometime go beyond the maximum count z and then begin to count from zero again. After an indefinite number of count cycles, however, a state will be reached in which a level capable of resetting the first up-counter V1, i.e., a H level, for example, applied to the control input of the first electronic make contact S1, occurs precisely when the make contact S1 is closed because the count has just reached the monitored range v ... z of the first up-counter V1 and, consequently, the make contact is closed via the first output A1 of the first decoder D1. In this case, the up-counter V1 is reset by the second signal F2.

When the count w is reached, the first monostable multivibrator M1 is triggered via the second output A2 of the first decoder D1. During the multivibrator's output pulse initiated by this trigger action, the up-down counter R is switched to forward counting via its up-down control input Eu, the duration of the above output pulse being chosen approximately so that during this period the first up-counter V1 passes through a number of counts which is double what corresponds to the difference x−w. For the time window T formed by the first multivibrator M1, the following approximation holds:

$$T \approx (2/f1)(x-w)$$

Each H level of the second signal F2 which arrives during the time window T is thus counted by the up-down counter R in the forward direction, while the pulses arriving outside the time window T are counted in the backward direction. From the fact that the count w is close to the frequency-ratio count x, it follows that, when the multivibrator M1 is triggered by the output A2, the frequencies are already so close together that practically each pulse of the second signal F2 then contributes to the forward count. After a few count cycles of the first up-counter V1, the upper count u is then reached in the up-down counter R, whereby the RS flip-flop RS is set via its S input. The H level at the Q output changes the first electronic switch U1 to the output A3, so that the up-counter V1 resets itself in each count cycle when the frequency-ratio count x is reached.

Simultaneously with the appearance of the H level at the Q output of the RS flip-flop RS, the second up-counter V2 is enabled via its start-reset input Er and counts all pulses of the second signal F2 until it reaches the maximum count z and stops there because the maximum count is locked. The maximum-count output Az thus provides the desired binary signal X indicating the presence or absence of the given frequency ratio $x'=f1/f2$.

If, on the other hand, the two signals differ during the "locked" condition, in which automatic resetting takes place via the frequency-ratio count x, the pulses of the second signal F2 will no longer fall within the time window T of the multivibrator M1 and will thus be counted down by the up-down counter R until the lower count l is reached whereby the RS flip-flop RS is reset to its R state. Consequently, the second up-counter V2 will be reset, too, and the binary signal X appearing at the maximum-count output Az will thus be at L level. As the first electronic switch U1 is switched over to the make contact S1, the second signal F2 is again applied as reset pulses to the reset input Er of the first up-counter V1. The "capturing" described at the beginning thus begins anew. Consequently, the counters V2, R also have an interference elimination function.

As already mentioned in the introductory part of the specification on pages 1 and 2, the digital circuit according to the invention can be used to advantage in television sets if the frequency ratio x' is chosen to be equal to the ratio between the horizontal frequency and the field frequency, and if such television sets include a vertical portion in which the vertical synchronizing pulses B are generated by frequency division of a signal of twice the horizontal frequency. The binary signal X can then be used to control such a vertical portion.

Figure 2:
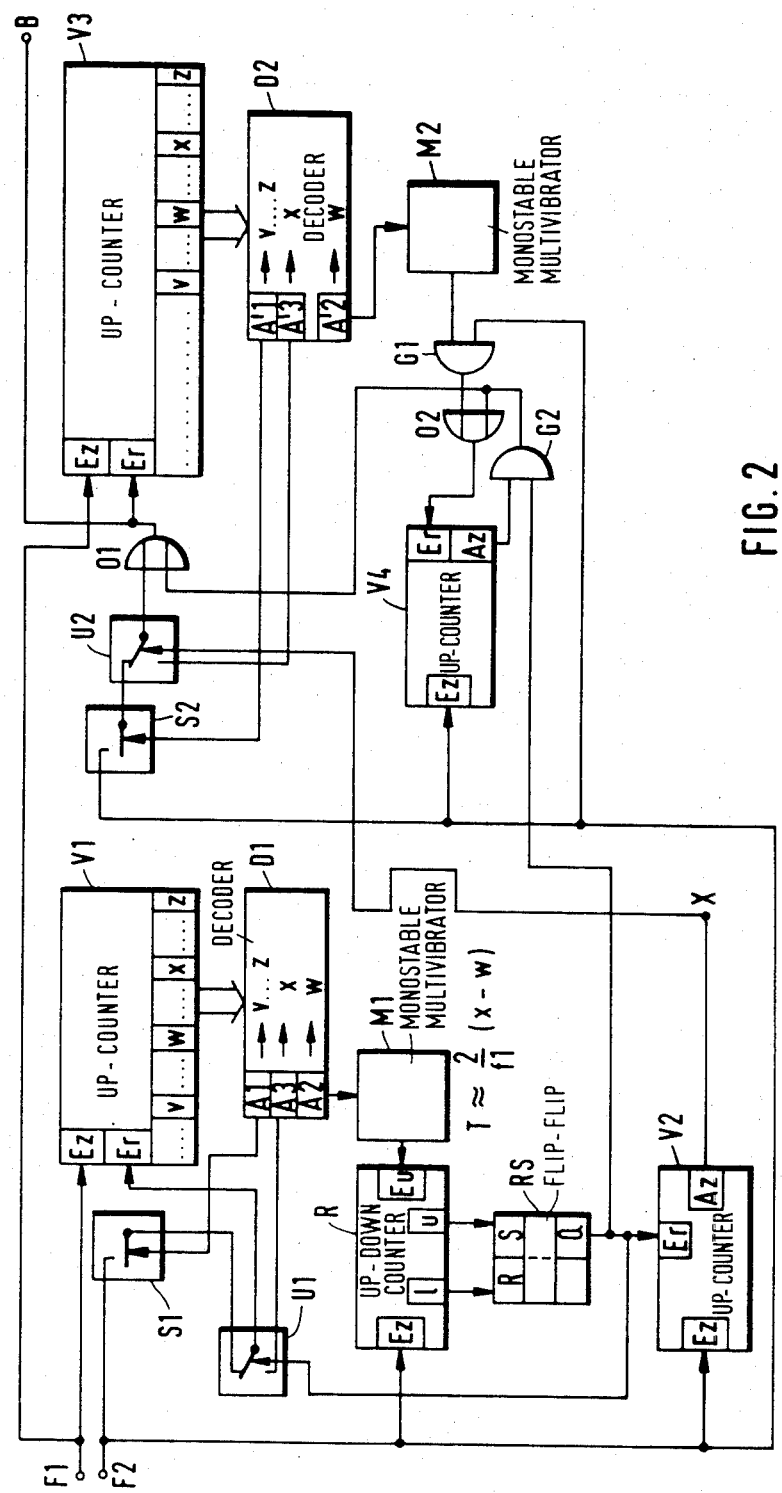
FIG. 2 is a block diagram illustrating the use of the arrangement of FIG. 1 for the vertical synchronization of a television receiver.

The block diagram of an embodiment of such an application is shown in FIG. 2, the left-hand half of which is identical with FIG. 1 as can be readily seen, so it need not be described again. The aforementioned frequency divider of the vertical portion is a third up-counter V3, whose count capacity z is equal to that of the first up-counter V1, and whose count input Ez, like that of V1, is fed with the first signal F1, which is the aforementioned signal of twice the horizontal frequency in this case, preferably a signal coming from the horizontal oscillator. A second decoder D2 monitors the same upper count range v ... z as the first decoder D1 for the first up-counter V1. The second decoder D2 has outputs similar to the outputs A1, A2, A3 of the first decoder D1, namely A'1 for all range counts v ... z, A'2 for the count w lying a few counts before the frequency-ratio count x, and A'3 for the frequency-ratio count x itself. The output A'1 is coupled to a control input of the second electronic make contact S2, whose signal input is fed with the second signal F2, i.e., in FIG. 2 with the suitably processed vertical synchronizing pulses separated from the received television signal. The second output A'2 of the second decoder D2 is connected to a trigger input of a second monostable multivibrator M2, and the third output A'3 is coupled to a first signal input of a second electronic switch U2, which has its first input connected to an output of the second electronic make contact S2. An output of the switch U2 is coupled to a first input of a first OR gate O1, the output of which is connected to the reset input Er of the third up-counter V3.

The output of the second monostable multivibrator M2 is coupled to a first input of a first AND gate G1, whose second input is fed with the second signal F2, which is also applied to the count input Ez of a fourth up-counter V4, whose maximum count is locked. The associated maximum-count output Az is connected to a first input of a second AND gate G2, whose second input is connected to the Q output of the RS flip-flop RS, and whose output is coupled to a first input of a second OR gate O2 and to a second input of the first OR gate O1. The output of the first AND gate G1 is connected to the second input of the second OR gate O2, which has its output coupled to the reset input Er of the fourth up-counter V4.

Figure 3:
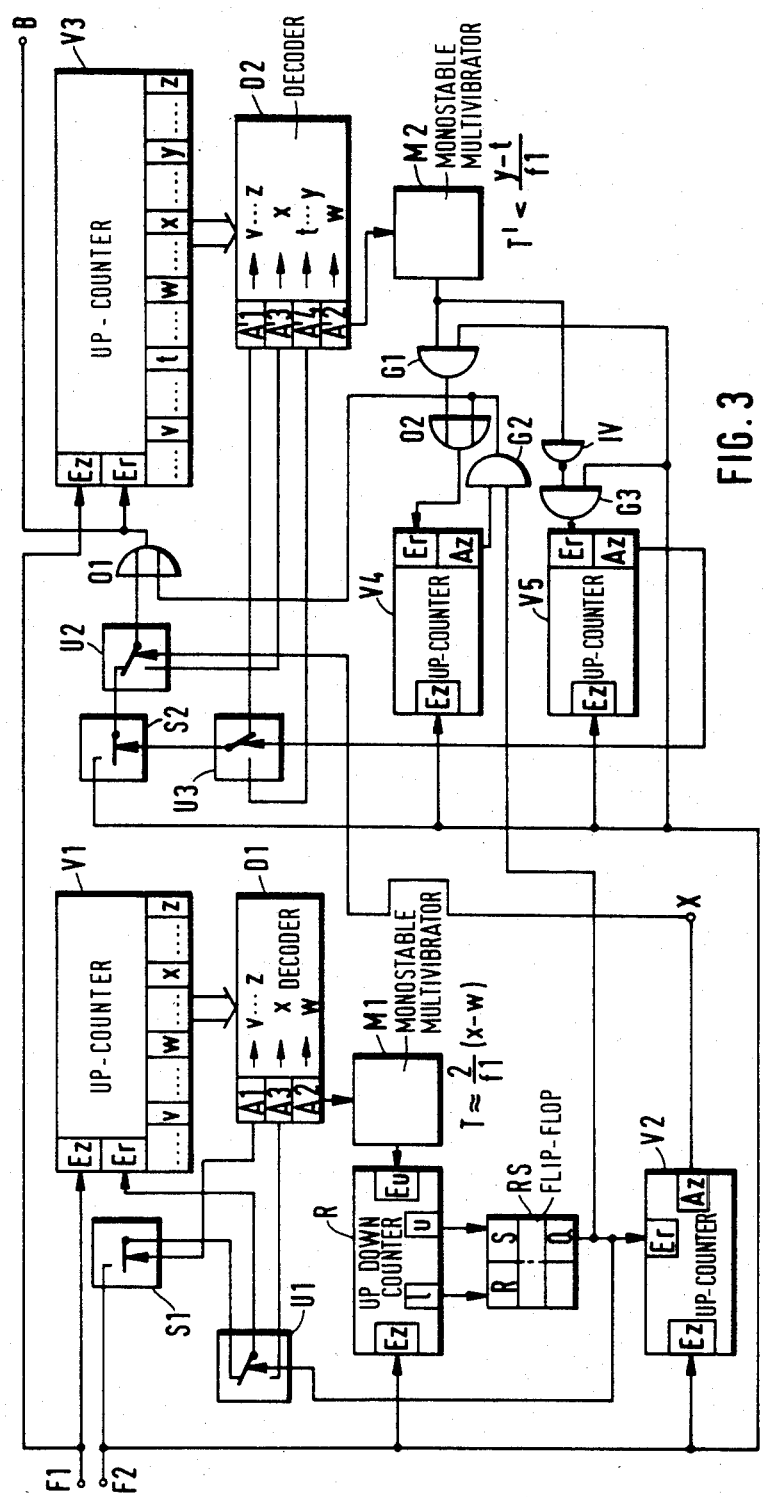
FIG. 3 is a block diagram of a further development of the arrangement of FIG. 2.

FIG. 3 shows a development of the arrangement of FIG. 2. This development consists in the addition of a fifth up-counter V5, a third AND gate G3 associated with the reset input of the counter V5, an inverter IV preceding this third AND gate G3, and a third electronic switch U3. The output signal of the second monostable multivibrator M2 is applied to a first input of the third AND gate G3 through the inverter IV, while a second input of the third AND gate G3 is fed with the second signal F2. The output of G3 is coupled to the reset input Er of the fifth up-counter V5, whose maximum count is locked as well. The associated maximum-count output Az is connected to the control input of the third electronic switch U3. The latter is so inserted in the connection between the first output A'1 of the second decoder D2 and the control input of the second electronic make contact S2 that its output is connected to the control input of the second decoder D2, while its first and second signal inputs are connected to the first output A'1 and the additional, fourth output A'4, respectively, of the second decoder D2, which output A'4 monitors a count section t . . . y, which is symmetrical with respect to the frequency-ratio count x and whose subsection lying before the frequency-ratio count x is greater than the difference x−w.

The operation of the third up-counter V3 with regard to the monitored range v . . . z and the counts w, x is identical with that of the first up-counter V1. In addition, however, the monitored section t . . . y permits a time window to be formed which is smaller than the time window determined by the monitored range v . . . z, and it is possible to "choose" between these two time windows by means of the third electronic switch U3, whose state depends on the signals appearing at the maximum-count output Az of the fifth up-counter V5. The transfer to the third output A'3, i.e., the decoding of the frequency-ratio count x of the third up-counter V3, is performed by means of the binary signal X from the digital circuit of FIG. 1, i.e., if the digital circuit has detected the presence of the exact frequency ratio x', the third up-counter V3 will be switched to "reset at the frequency-ratio count x", irrespective of the other processes taking place in its associated subcircuits. This is done by changing the second electronic switch U2 to the third output A'3, so that the count x is transferred through the first OR gate O1 to the reset input Er of the third up-counter V3. The output signal of the first OR gate O1 is also the internally generated vertical synchronizing signal B. If, therefore, the binary signal X is at H level, the decoding of the count x of the third up-counter V3 results in an output pulse B after every x' pulses of the first signal F1, i.e., the signal of twice the horizontal frequency, which pulse B also resets this counter.

During the operation of the third up-counter V3 determined by the H level of the binary signal X, the phase relation between the two signals F2, B is additionally measured. This function is performed by the fourth up-counter V4 and its associated subcircuits. For this phase measurement, the time window formed by means of the second monostable multivibrator M2 is used; if the pulses of the second signal F2, i.e., the transmitted vertical synchronizing pulses, fall within this time window (only then will a H level appear at the output of the first AND gate G1), the fourth up-counter V4 will be reset via the second OR gate O2, so that those pulses of the second signal F2 applied to the input of the fourth up-counter V4 will not be counted. Thus, if the phase relationship is correct, this counter will not count. If, however, the phase relationship begins to depart from zero, the reset pulses will no longer appear and the counter will count the pulses of the second signal F2. The pulse of the second signal F2 resulting in the attainment of the maximum count of the fourth up-counter V4 causes the fourth up-counter V4 and the third up-counter V3 to be reset via the second AND gate G2 and the first OR gate O1, respectively, so that the third up-counter V3 now runs in phase with the second signal F2 again. However, this twofold resetting will be permitted by the second AND gate G2 only if a H level is also present at the Q output of the RS flip-flop RS in the digital circuit of FIG. 1, i.e., if the digital circuit has already detected a fairly correct frequency ratio. This H level at the Q output occurs only if the digital circuit has detected the correct frequency ratio x' during several pulses of the second signal F2.

The additional, fifth up-counter V5 in FIG. 3 controls the third switch U3 and, thus, the above-mentioned switchover between the two count ranges v . . . z and t . . . y. This additional switchover results in a further improvement in performance, particularly if the television set is equipped for video-recorder operation. The wiring of the reset input Er of the fifth up-counter V5 via the inverter IV and the third AND gate G3 is such that pulses of the second signal F2 which fall within the time window formed by the second multivibrator M2 are counted (such pulses are not counted by the fourth up-counter V4). When the up-counter V5 reaches its maximum count, switchover of the third electronic switch U3 is effected via the maximum-count output Az, i.e., after a time determined by the count capacity of the fifth up-counter V5, which may be adjustable, switchover is effected between the outputs A'1 and A'4 of the second decoder D2, i.e., between the monitored range v . . . z and the count section t . . . y.

The time window T' of the second monostable multivibrator M2 is chosen to be slightly smaller than the time required to pass through the count range t . . . y, i.e., $$T' < (y-t)/f1$$

In a practical circuit arrangement for the European television standard (frequency ratio x'=625) or alternatively the American television standard (frequency ratio x'=525), the following numerical values were chosen for the individual counts of the up-counters V1, V3:

v=561
t=618
w=620
x=625
y=632
z=689

Switchover between the European and the American standard is effected simply by setting the two counters V1, V3, which are designed as up-counters, to the count 100 in the case of the American standard and then resetting them to this count.

In the aforementioned practical circuit, the up-down counter R monitored the counts <2 and >5, which serve to drive the R input and S input, respectively, of the RS flip-flop RS. The maximum counts of the counters V2, V4, and V5 were 4, 4, and 256, respectively. The time windows T, T' of the multivibrators M1, M2 had the values T=320 μs, T'=320 μs. The maximum count of the counter R was 12.

The multivibrators M1, M2 are advantageously implemented with digital circuits, e.g., suitably connected counters.

It is obvious that, while the invention was described and explained on the basis of positive logic, an implementation of the same function by means of circuits based on negative logic represents no departure from the basic idea of the invention. Such implementation and the changes necessary in the circuit in connection therewith lie within the field of activity of a person skilled in the art. It is also within the scope of the invention to replace the AND and OR gates shown with other basic logic gates if the invention is realized using MOS technology, for example. This, too, lies within the range of action of a person skilled in the art. The measure of interference elimination by the counter R is determined by the difference between the maximum count and the upper count u; the greater this difference, the better the interference-elimination effect. A compromise must be found between this effect and the system's reaction time, which, too, depends on the maximum count of the counter R. It may be advantageous to provide the counter R with a reset input to which a special reset signal is applied in case of need.

What is claimed is:

1. A digital circuit for generating a binary signal on the occurrence of a given frequency ratio of a high frequency first and a second signals, comprising:
   a first up-counter having a count input to which the higher-frequency first signal is applied and whose maximum count is greater than the frequency ratio;
   an up-down counter having a count input to which is applied the second signal;
   a first decoder connected to outputs of the first up-counter for monitoring the attainment of a count of the first up-counter in an upper range of successive counts which includes the frequency-ratio count and the maximum count and having a first output for all range counts, a second output for a count lying a few counts before the frequency-ratio count, and a third output for the frequency-ratio count;
   a first electronic make contact switch having a control input connected to the first output of the first decoder, a signal input being fed with the second signal, and an output;
   a first monostable multivibrator having a trigger input and an output, the trigger input connected to the second output of the first decoder;
   a first electronic switch having a control input, first and second signal inputs and an output connected to a reset input of the first up-counter, the third output of the first decoder being coupled to the first signal input and the second signal input connected to the output of the first electronic make contact switch;
   the up-down counter having a control input connected to the output of the first monostable multivibrator and at least one lower count output and at least one upper count output;
   an RS flip-flop having an R input connected to the lower count output, an S input connected to the upper count output and a Q output coupled to the control input of the first electronic switch; and
   a second up-counter whose maximum count is locked, having a count input receiving the second signal, and a start-reset input connected to the Q output of the RS flip-flop and a maximum-count output providing the binary signal.

2. A digital circuit as claimed in claim 1, adapted for use in television sets, wherein the frequency ratio is equal to the ratio between horizontal frequency and field frequency, to control a vertical portion in which the vertical synchronizing pulses are generated by frequency division of a signal of twice the horizontal frequency.

3. A digital circuit as claimed in claim 2, wherein the first signal is a signal of twice the horizontal frequency, additionally comprising:
   a third up-counter, whose count capacity is equal to that of the first up-counter, having a count input receiving the first signal;
   a second decoder connected to the outputs of the third up-counter for monitoring the attainment of a count of the third up-counter in the same upper range of successive counts as the first up-counter and having a first output for all range counts, a second output for a count lying a few counts before the frequency-ratio count, and a third output for the frequency-ratio count;
   a second electronic make contact switch having a control input connected to the first output of the second decoder, a signal input being fed with received vertical synchronizing pulses as the second signal and an output;
   a second monostable multivibrator having a trigger input and an output, the trigger input connected to the second output of the second decoder;
   a second electronic switch having a control input, first and second signal inputs and an output, the first signal input connected to the third output of the second decoder;
   a first OR gate having a first input coupled to the output of the second electronic switch and an output connected to a reset input of the third up-counter and providing the vertical synchronizing pulses;
   a first AND gate having a first input connected to the output of the second monostable multivibrator and a second input being fed with the second signal;
   a fourth up-counter, whose maximum count is locked, having a count input fed with the second signal and the maximum-count output;
   a second AND gate having a first input connected to the maximum count output of the fourth up-counter and a second input connected to the Q output of the RS flip-flop and an output coupled to a second input of the first OR gate; and
   a second OR gate having a first input connected to the output of the second AND gate and a second input coupled to the output of the first AND gate, and an output connected to a reset input of the fourth up-counter, and the binary signal being applied to the control input of the second electronic switch.

4. A digital circuit as claimed in claim 3, wherein,
the second decoder has a fourth output for a count section which is symmetrical with respect to the frequency-ratio count and whose subsection lying before the frequency-ratio count is greater than the difference between the frequency ratio count and the count at the second output for a count lying a few counts before the frequency-ratio count;
inserted in the connection between the first output of the second decoder and the control input of the second electronic make contact is a third electronic switch which has its output coupled to the control input of the second electronic make contact, while its first and second signal inputs are connected, respectively, to the first output and the fourth output of the second decoder; and
the output of the second monostable multivibrator is coupled through an inverter to the first input of a third AND gate whose second input is fed with the second signal, and the second signal is applied to the count input of a fifth up-counter whose maximum count is locked and which has its reset input connected to the output of the third AND gate, while its maximum-count output is coupled to the control input of the third electronic switch.

* * * * *